RALPH H. MARTIN,
INVENTOR.

BY Hazard & Miller
ATTORNEYS

Aug. 4, 1953 R. H. MARTIN 2,647,337
APPARATUS FOR PRESSING PRINT TISSUE ONTO ARTICLES
Filed Aug. 14, 1950 5 Sheets-Sheet 2

RALPH H. MARTIN,
INVENTOR.

BY
Hazard & Miller
ATTORNEYS

RALPH H. MARTIN, INVENTOR.

Patented Aug. 4, 1953

2,647,337

UNITED STATES PATENT OFFICE 2,647,337

APPARATUS FOR PRESSING PRINT TISSUE ONTO ARTICLES

Ralph H. Martin, Los Angeles, Calif., assignor to Vernon Kilns, Los Angeles, Calif., a corporation of California Application August 14, 1950, Serial No. 179,344

4 Claims. (Cl. 41—1)

This invention relates to apparatus for operating on an article having print tissue initially applied thereto to cause a transfer of the print from the tissue to the article.

It is a main object of the present invention to provide an apparatus which can quickly and efficiently press the print tissue against an article carrying the tissue to cause a transfer of the print from the tissue to the article without breaking the article or smearing the print on the article.

It has been found that in order to obtain a transfer of a print to an article by machine that it is for all practical purposes necessary to apply forces to the article which are sufficient to fracture or break the article. It is an object of the present invention to provide an apparatus wherein the forces used to effect a transfer of the print are sufficient to easily break or fracture the article, but which forces are so applied that the transfer is effected without breaking or fracturing.

The present invention contemplates an apparatus having a pair of diaphragms supported for movement away from one another to receive a print tissue-carrying article therebetween and movable toward one another to enclose the article and thereafter the machine operates to supply air under pressure behind the diaphragm to cause the diaphragms to press the article therebetween to cause the transfer of the print, the article being supported by the diaphragms so as not to be subjected to bending forces which would readily break or fracture the article.

Another object of the present invention is to provide a rotary turret type apparatus having a plurality of pairs of diaphragms which apparatus is so operated that large production is possible.

Another object of the invention is to provide an apparatus which can handle a plurality of differently shaped print tissue-carrying articles without requiring special molds or forms for each shape.

With the foregoing and other objects in view, which will be made manifest in the following detailed description and specifically pointed out in the appended claims, reference is had to the accompanying drawings for an illustrative embodiment of the invention, wherein:

Fig. 3 is a fragmentary sectional view in elevation along lines 3—3 of Fig. 2;

Fig. 4 is a sectional view in elevation along lines 4—4 of Fig. 2, showing a pair of diaphragms in open position;

Fig. 5 is a view similar to Fig. 4, showing the diaphragms in closed positon;

Fig. 11 is a view in plan of the forward side of an air control valve, as indicated by line 11—11 on Fig. 3;

Fig. 12 is a schematic view of a valve used to supply air to the diaphragms; and Fig. 13 is a schematic view of a valve used to supply air to the pneumatic means for opening and closing the diaphragms.

Figure 1:
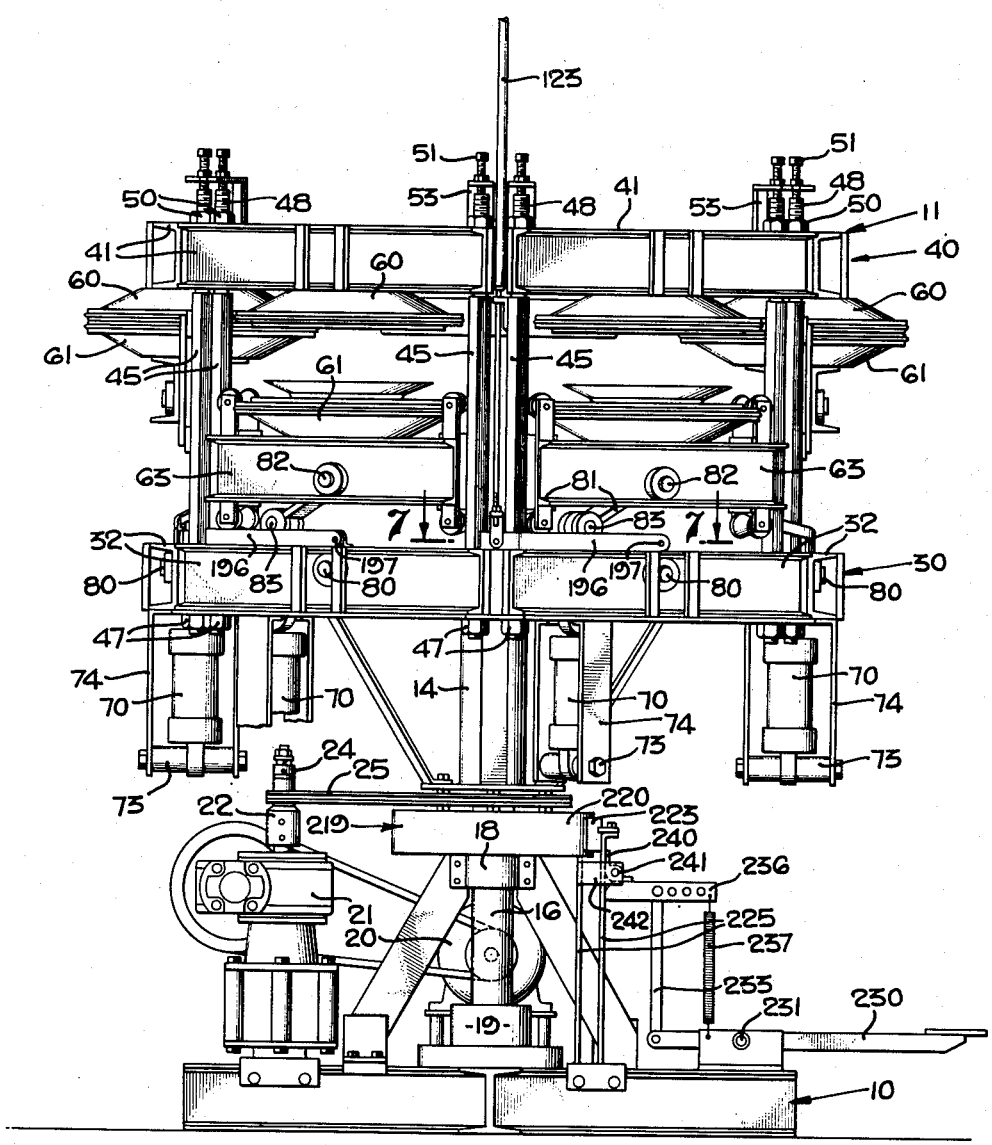
Figure 1 is a side view in elevation of an apparatus embodying the present invention.

Referring to the accompanying drawings wherein similar reference characters designate similar parts throughout, Fig. 1 shows an apparatus embodying the present invention comprising a main supporting frame generally entitled 10, on which is mounted a rotary turret, generally entitled 11, said turret having a hollow center supporting post 14 from which extends an extension 16. Extension 16 is rotatably supported by spaced bearings 18 and 19 on frame 10 so that turret 11 is supported for rotation from frame 10. Means for driving the turret comprise a prime mover 20 which may be an electric motor which drives a reduction unit 21 which has an output shaft 22 which drives through a friction drive 24, a belt 25 which drives the hollow supporting post 14 through a suitable pulley or sheave. The motor 20 when energized serves to continuously rotate the turret.

Turret 11 comprises a lower frame, generally entitled 30 composed of a plurality of pairs of channel beams 32 suitably connected together such as by welding. There are radially extending I-beams 35 connected by nuts and bolts 36 and plates 37 to channel beams 32 and radially extending I-beams 35 are secured to the central supporting post 14 in any suitable manner; such as by welding as shown in Fig. 3. There is an upper frame member, generally entitled 40, which is composed of a plurality of pairs of channel beams 41 which are connected in end-to-end relationship and which are supported on a plurality of non-circular posts 45, see Fig. 5. Posts 45 have reduced ends 46 receivable through the lower frame 30 and secured thereto by nuts 47. Posts 45 have reduced upper ends 48 receivable through upper frame 40 which frame is adjustable with respect to posts 45 by means of nuts 50 and adjusting screws 51 which are threadedly received through angular supports 53 as best shown in Fig. 5. It is obvious from Fig. 5 that the upper frame 40 may be adjusted along the posts 45 by suitable manipulation of nuts 50, adjusting screws or bolts 51 and locknuts 55 carried by the adjusting bolts or screws 51.

Figure 2:
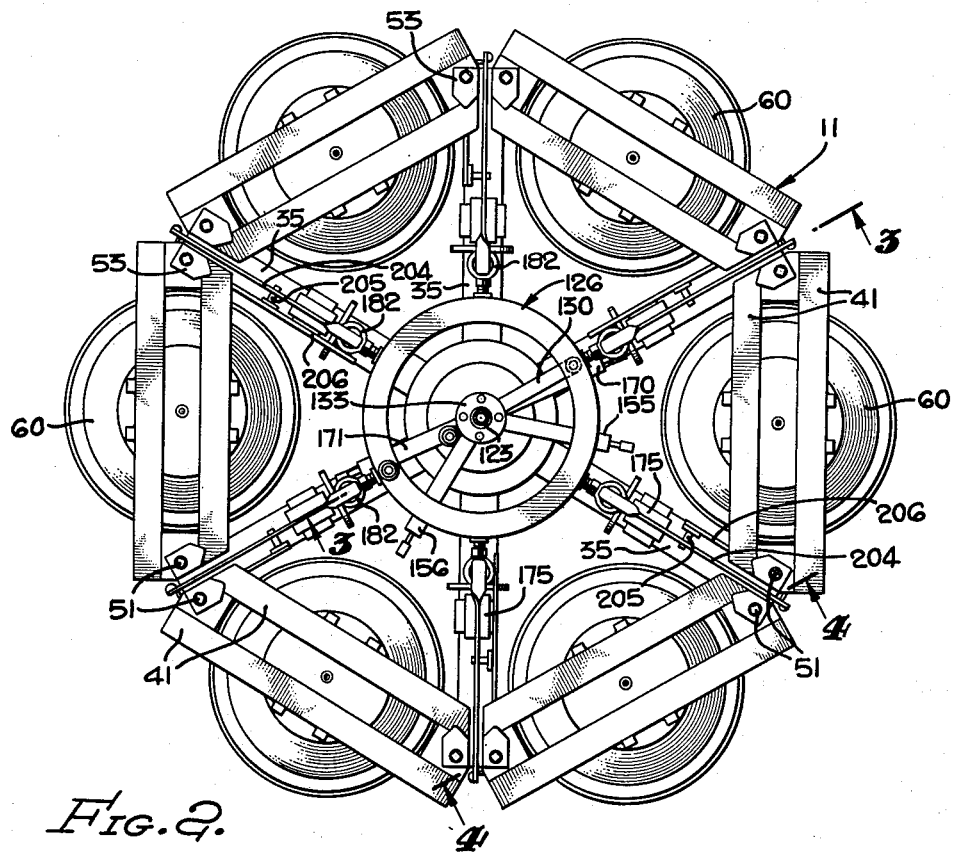
Fig. 2 is a plan view of the apparatus depicted in Fig. 1.

Upper frame 40 carries a plurality of upper diaphragm carriers 60 distributed therearound as shown in Fig. 2, and secured to frame 40. There are a plurality of lower diaphragm carriers 61 secured to wheeled frames 63 which wheeled frames have wheels 64 engaging posts 45 to be guided thereby. There are means for causing wheeled frames 63 to be reciprocated along posts 45 so that the diaphragm carriers 60 and 61 can be opened to have a print tissue-carrying article inserted therebetween and closed to thereby enclose the article between diaphragms 68 and 69 secured to diaphragm carriers 60 and 61, respectively. The means for opening and closing the diaphragm carriers and the diaphragm comprise a plurality of pneumatic rams having cylinders 70 and piston rods 71, said cylinders being pivotally supported at 73 from hangers 74, said hangers being secured at their upper ends to the lower frame 30. Piston rods 71, as shown in Fig. 5, are pivoted to bellcranks 77, said bellcranks being pivoted at 80 to lower frame 30. Links 81 are pivoted at 82 to wheeled frames 63 and pivoted at 83 to the bellcranks 77. There is a suitable valve system to be described for supplying air to cylinder 70 to cause the pneumatic rams to move the bellcranks from the position shown in Fig. 4 to the position shown in Fig. 5 wherein links 81 and the upper legs 87 of the bellcranks are in line, and therefore, downward thrust from the diaphragm carriers and diaphragms will be transmitted to the pivots 80 and only to a slight extent to the pneumatic rams. Therefore, the main support for the diaphragm carriers and diaphragms in their closed position is the in-line links 81 and legs 87 and pivots 80 so that there is no direct load imposed on the pneumatic rams which raise the lower diaphragm carriers 61.

Figure 8:
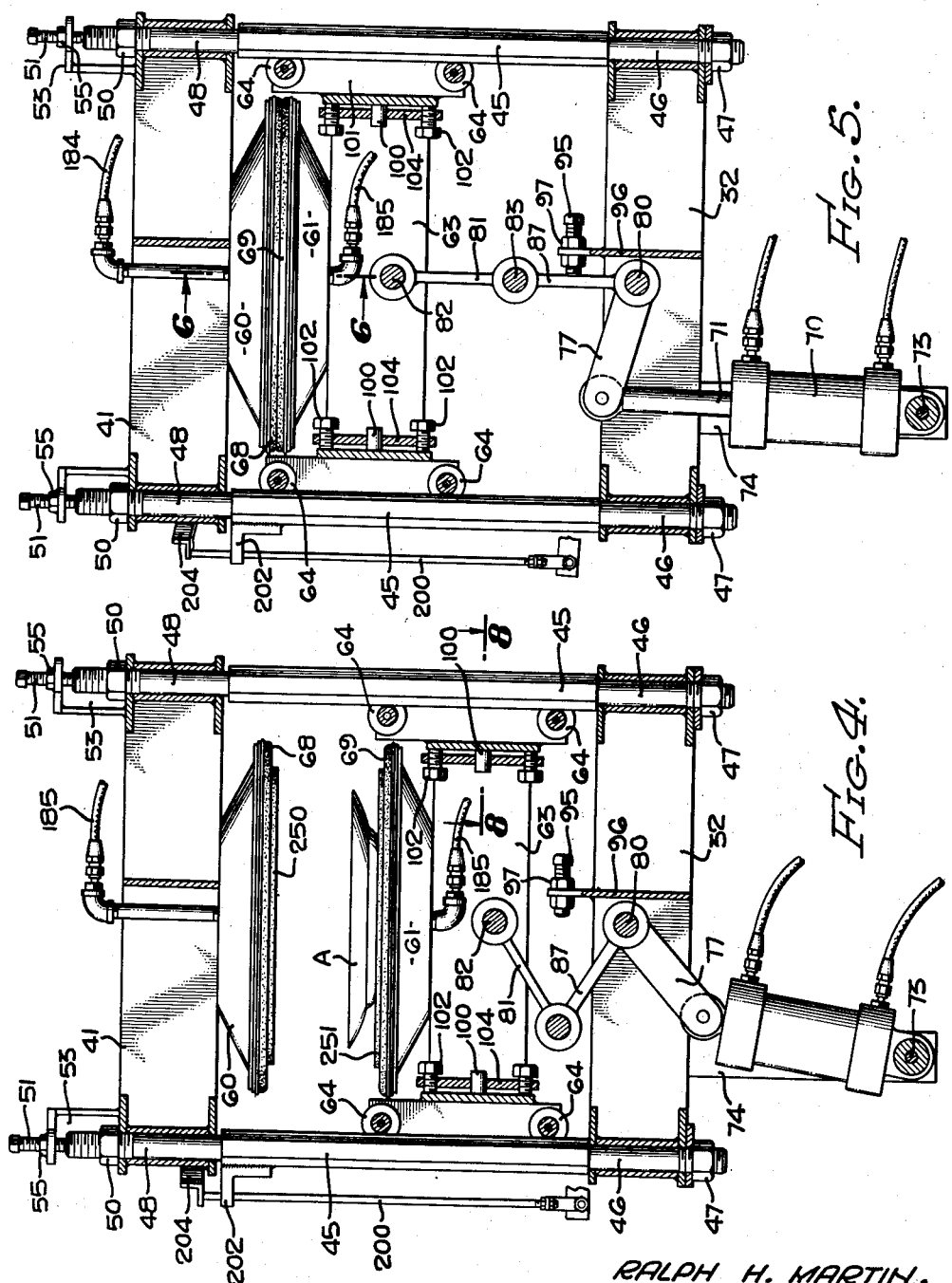
Fig. 8 is a fragmentary sectional view in plan along lines 8—8 of Fig. 4.

There are stop bolts 95 provided as shown in Fig. 5, to limit clockwise movement of bellcranks 77 to a position where the legs 87 and links 81 are in line. Stop bolts 95 are received through supports 96 secured to lower frame 30 and stop bolts 95 are adjustable through supports 96 by means of locknuts 97. The wheeled frames 63 have the wheels 64 adjustable outwardly and inwardly with respect thereto by means of guide pins 100 which are mounted on subframes 101 which have bolts 102 threadedly received through flanges 104 on the center portions of wheeled frame 63. Subframes 101 are also adjusted by means of set screws 106 within the main frames of wheeled frames 63 as best shown in Fig. 8, Fig. 8 also showing the construction of wheels 64 which have reduced center portions to provide inwardly inclined faces to fit the faces of posts 45.

Figure 6:
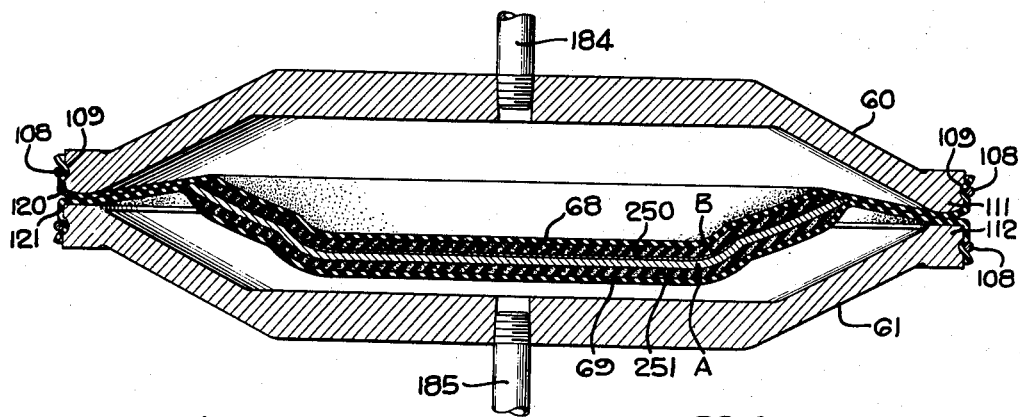
Fig. 6 is a sectional view in elevation along lines 6—6 of Fig. 5, showing a print tissue-carrying article enclosed and pressed between two diaphragms.

Diaphragms 68 and 69 are secured to their respective carriers as shown in Fig. 6 by means of wires 108 which overlie annular grooves 109 provided in the peripheral surfaces of the diaphragm carriers 60 and 61. However, reliance is not placed on wires 108 to retain the diaphragms onto the carriers during operation of the device but the diaphragms are retained on their carriers by means of the pressure created by rims 111 and 112 provided by diaphragm carriers 60 and 61, respectively, as shown in Fig. 6. When the links 81 and legs 87 of bellcranks 77 are in aligned position the portions of diaphragms 68 and 69 overlying rims 111 and 112 are firmly pressed between the rims thereby providing an airtight seal between the diaphragms and the diaphragm carriers, and this operation accomplishes two results. One, air which is supplied in a manner to be described, to the carriers 60 and 61 cannot escape between the diaphragms and the diaphragm carriers but is confined in the concave portions of the carriers so as to be effective against the diaphragms to cause the diaphragms to press the print-carrying article A in Fig. 6 to cause a transfer of the print from the print tissue B to the article A. The other result achieved by firmly pressing the diaphragms together at the location of the rims 111 and 112 is to prevent load being imposed on wires 108, since there would be a tendency for the diaphragms to pull inwardly and pull loose from the wires 108 and it is the purpose of the present invention not to impose such a load on the wires 108.

Figure 9:
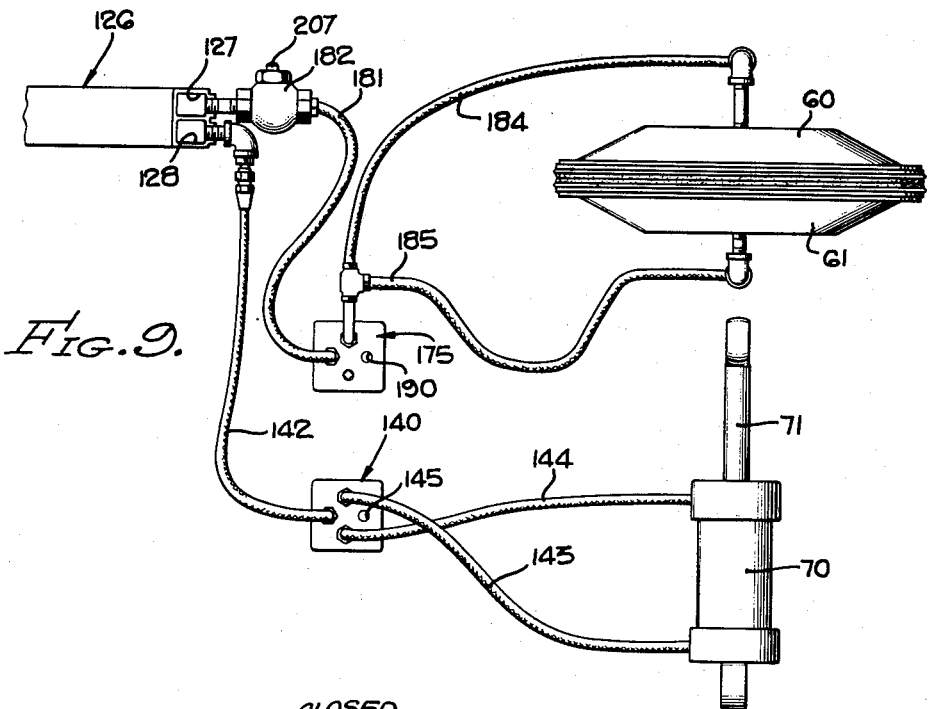
Fig. 9 is a schematic view of the air pressure lines or conduits connected to the diaphragms and the means for opening and closing the diaphragms.

Diaphragms 68 and 69 are apertured at 120 and 121, respectively, so that if for any reason the diaphragms are inflated prior to closing of the diaphragms that the air will escape through apertures 120 and 121, thereby preventing permanent damage to the diaphragms and preventing the diaphragms from being torn loose from the carriers 60 and 61. It is important that the diaphragms be firmly pressed between rims 111 and 112 prior to the supplying of air behind the diaphragms so as to avoid rupturing of the diaphragms and also to prevent the diaphragms from being torn loose from the carriers 60 and 61. An air pressure system for supplying air to cylinders 70 and carriers 60 and 61 is provided and so constructed that air will always be supplied to the cylinders 70 prior to carriers 60 and 61 so that the above undesirable results will be avoided. The air pressure system is best shown in Figs. 3 and 9, and in Fig. 3 there is a central air pressure supply line 123 which is stationary and which is threaded into the upper end of a stationary support 124 which extends through central hollow supporting post 14 and is secured at its lower end to the lower end of frame 10. Air under pressure is supplied from supply pipe 123 to an annular member 126 having an upper annular passage 127 and a lower annular passage 128. Air from air supply pipe 123 is conducted through conduits 130 directly from bore 131 in the upper end of stationary member 124 as shown in Fig. 3, conduits 130 being secured to a rotatable shell 133 which has suitable packing 135 therewithin to prevent the escape of air between shell 133 and fixed member 124. There is a supply line 138 disposed oppositely of supply line 130 and leads to a pressure reducing valve 139 through a safety valve 140 to the upper passageway or chamber 127. A single source of supply of air under pressure is used in the embodiment of the invention disclosed but as the pressure required for the cylinders 70 is higher than required for the diaphragms 68 and 69, the pressure to the diaphragms is reduced through the reducing valve 139. Larger cylinders 70 can be used instead of a higher pressure but it is usually more convenient to use the relatively small cylinder 70 instead of large cylinders.

There are a plurality of air control valves 140 which are used to control the air to the cylinders 70, there being one valve for each of the cylinders 70, said valves being mounted on lower frame 30 as shown in the case for one valve in Fig. 3. Control valves 140 for cylinders 70 are connected by flexible conduits 142 to the lower annular chamber 128 as best shown in Fig. 9 and connected by conduits 143 and 144 to cylinders 70, said valves having exhaust ports 145. Valves 140 have rotatable plates 147 provided with lugs 148, said plates being secured by stems 150 to the movable elements 151 of valves 140, see Figs. 3 and 13. Valves 140 are of a common type and the schematic diagram in Fig. 13 shows this type. The valves are constructed so that when the movable valve elements 151 are moved from the solid line position in Fig. 13 to the dotted line position that air will be alternately supplied to opposite sides of the pneumatic rams in cylinders 70, therefore causing the lower diaphragm carriers 61 to be reciprocated to open and close the diaphragms to allow the insertion of print tissue-carrying article between the diaphragms and the removal of print tissue-carrying article from between the diaphragms. Valves 140 are actuated by an upper arm 155 and lower arm 156 carried by stationary member 124, see Fig. 3. Upper arm 155 is located at an angle with regard to the lower arm 156 as can be seen by comparing Figs. 2 and 10. Upper arm 155 is adapted to engage lugs 148 of valves 140 and actuate the valves so that air under pressure is supplied to one side of the pneumatic ram and arm 156 is adapted to actuate lugs 148 to cause air under pressure to be supplied to the other sides of the pneumatic rams within cylinders 70. It is obvious from Fig. 13 that whenever the valves 140 are actuated in either direction that the air under pressure on the opposite side of the ram will be conducted through the exhaust passage 145 of valves 140.

Figure 10:
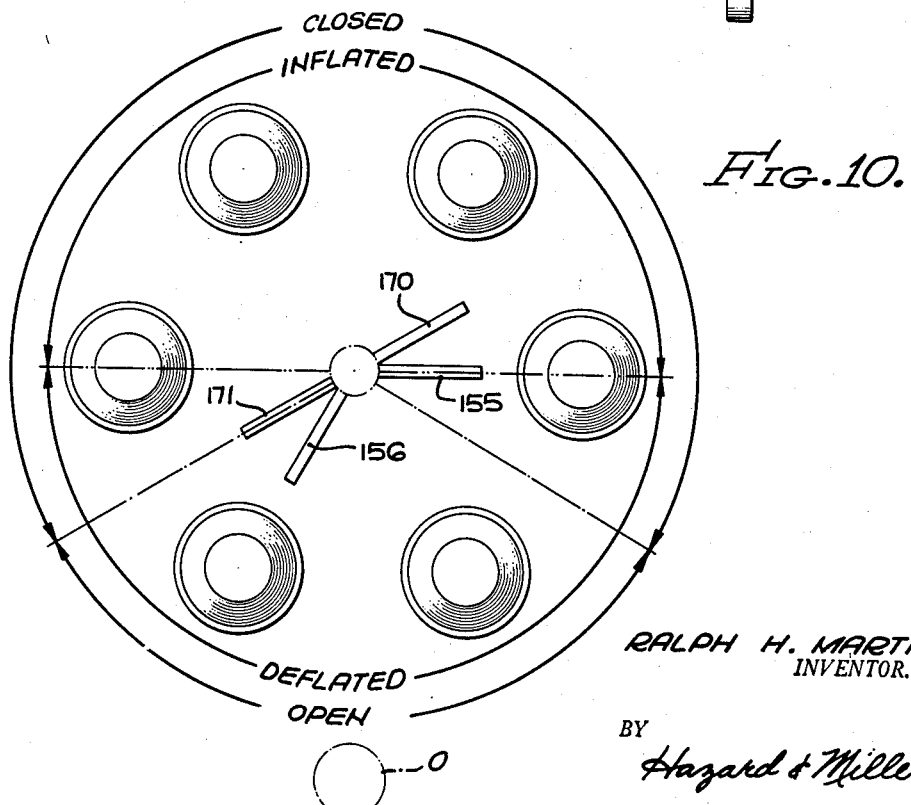
Fig. 10 is a diagram showing the relationship between opening and closing of the diaphragms and inflation and deflation of the diaphragms.

From Fig. 10 it can be seen that during 240° of travel the valves 140 are actuated in one direction to raise the pneumatic rams and that during the remaining 120° the valves 140 are actuated to lower the pneumatic rams. The turret as depicted in Fig. 10 rotates in a clockwise direction and therefore, each of the valves 140 will be actuated by arm 155 so as to supply air under pressure to the cylinder thereof to cause the pneumatic ram associated with the actuated valve to move downwardly, thereby lowering the lower diaphragm carrier 61 and opening the diaphragms. As the valves progress around in a clockwise direction arm 156 will thereupon contact each valve 140 and serve to actuate the valve in the opposite direction so that the pneumatic rams associated with the valves 140 will be actuated so as to close the diaphragms.

There are arms 170 and 171 fixedly secured to stationary member 124 and positioned opposite one another as shown in Fig. 10 so that valves 175 which are actuated by arms 170 and 171 in a manner similar to the actuation of valves 140 will be actuated first prior to and then subsequent to the actuation of valves 140. That is, as seen in Fig. 10, arm 170 which is the upper arm will contact lugs 176 of valves 175 and actuate the valves prior to the actuation of the pneumatic rams which are actuated by arms 155. Arm 170 serves to actuate valves 175 so as to cause deflation of the diaphragms and arm 171 actuates valves 175 so as to cause inflation of the diaphragms 68 and 69. Therefore, the above construction insures that the diaphragms will not be inflated while they are in open position but only inflated when they are in closed position thereby preventing permanent damage to the diaphragms.

Figure 7:
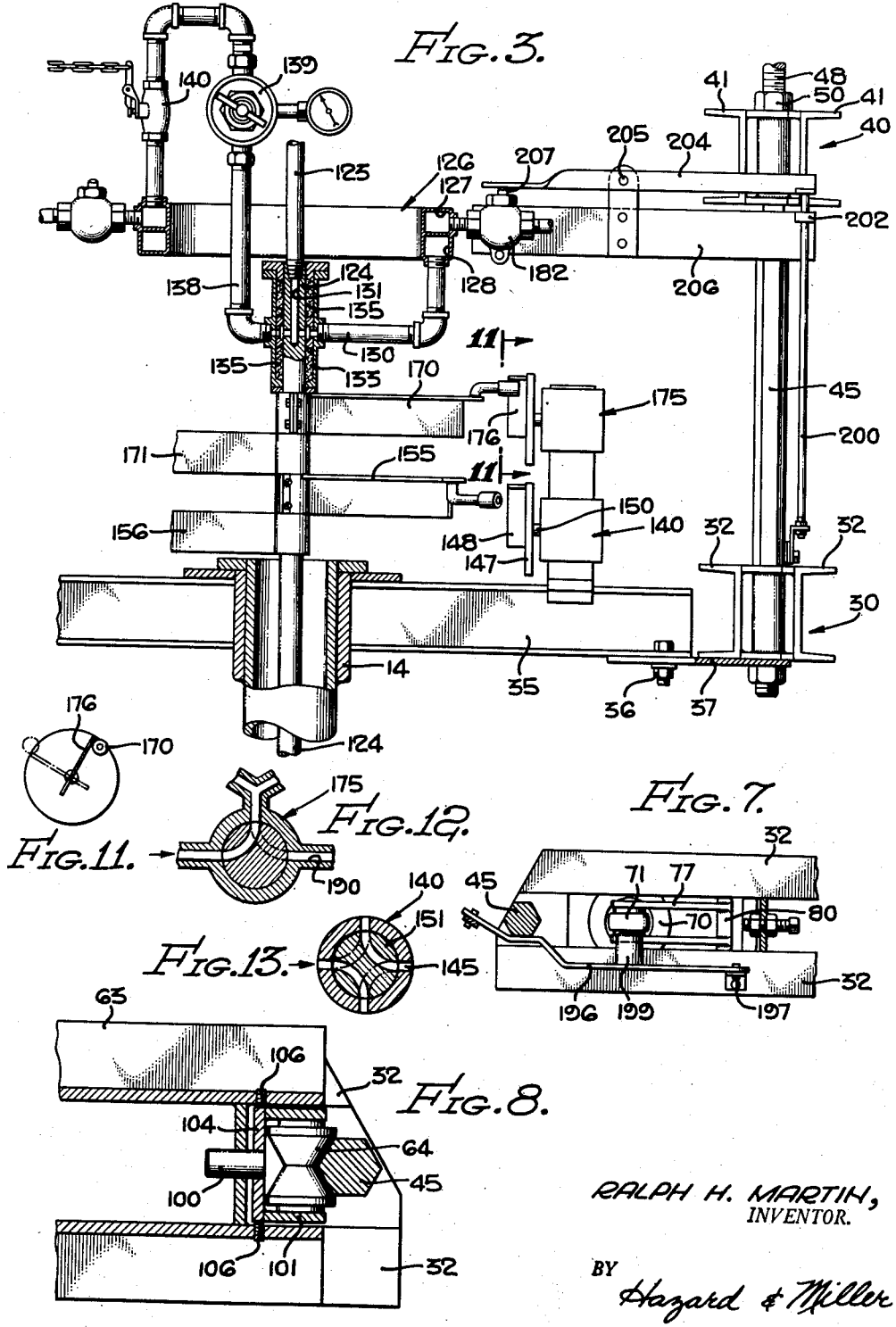
Fig. 7 is a fragmentary sectional view in plan along lines 7—7 of Fig. 1.

Despite the above safeguard, on occasions valves 140 have become clogged due to various circumstances beyond the control of the operator, and therefore there resulted some damage to the diaphragms which were inflated while the diaphragms were open. To prevent this a safety arrangement is provided so that it will be impossible for the diaphragms to be inflated unless the rams have moved to close the diaphragm. This safety system is best seen in Figs. 3, 7, and 9. In Fig. 9, there is shown one of a plurality of conduits 181 which lead from upper chamber 127 and connect to valves 175. In each of conduits 181 there is a control valve 182 which is adapted to be actuated when the pneumatic ram associated therewith is raised. There are conduits 184 and 185 leading from the outlet sides of valves 175, valves 175 being constructed as shown schematically in Fig. 12 so that when the valves are turned one way air will be supplied to the diaphragms but when the valve is turned the other way the diaphragms will be connected to the atmosphere through an exhaust port 190.

The actuating system for the control valves 182 is best shown in Figs. 3 and 7 and comprises levers 196 pivoted at 197 to the lower frame 130, said levers having lugs 199 extending therefrom and adapted to be actuated by piston rods 71 when the piston rods are raised. There are actuating rods 200 pivotally carried to the outer ends of levers 196, the upper ends of the rods being guided by lugs 202 carried by posts 45 as shown in Figs. 4 and 5. There are valve actuating levers 204 pivotally supported at 205 on arms 206, which arms are secured to posts 45 by the outer ends of the arms and the arms are secured at their inner ends to safety or control valves 182 which are connected to the annular member or manifold member 126, thereby supporting the annular or manifold member 126. The inner ends of valve actuating levers 204 bear against pins 207 of safety valves 182. As each pneumatic ram is supplied with air its piston rod will engage the associated safety valve lever system so as to cause actuation of the actuating lever thereof to depress the pin 207 of the associated control or safety valve and thereby open the associated conduit 181 so that air can be supplied to the associated diaphragm control valve 175, the supplying of air to the pneumatic rams being caused by the engagement of arm 156 with the air control valve for the pneumatic ram. Also, the valves 182 will be successively closed as arm 155 successively actuates valves 140 to cause the pneumatic rams to be lowered, thereby allowing pins 207 to rise preventing inflation of the diaphragms at all times when the diaphragms are in open condition. Therefore, if some of the valves 140 for the pneumatic rams become clogged the above construction will prevent the rams from rising and through the lever system opening the safety valves 182.

In the plan views as shown in Figs. 2 and 10, it can be seen that the air control valves for the diaphragms and pneumatic rams are located circumferentially 15° behind the diaphragms and rams which they control, and this explanation accounts for the location of the arms 155, 156, 170, and 171 with reference to the location of the operator O, particularly as shown in Fig. 10. The arms, therefore, trail the diaphragms and rams which they control.

There are means for retarding or stopping the turret to permit the operator to remove an article or insert an article between the diaphragm in case the operator for any reason fails to successfully remove or insert the article at the first try. In such a case, the operator merely operates the braking means to slow down the turret to enable the operator to successfully complete the inserting or removing operation of the article. These braking means comprise a drum 219 having a depending flange 220 adapted to be pressed between a pair of brake shoes 223, one of which is shown in Fig. 1. The brake shoes are supported on flexible supports 225 secured at their lower ends to frame 10. There is a suitable brake shoe actuating mechanism comprising a foot lever 230 pivoted at 231 to frame 10 and having a link 233 pivoted at the outer end thereof. There is an actuating link 236 pivoted intermediate the ends thereof to the upper ends of link 233. A tension spring 237 is secured by one of its ends to the right-hand end of actuating link 236 and at its other end to frame 10. The inner end of actuating link 236 bears against a pivoted bellcrank shoe actuating member 240 which is pivoted at 241 on supports 242 secured to the left-hand shoe supporting member. When the foot lever 230 is depressed the bellcrank member 240 will be pivoted to cause the shoes to engage the depending flange 220 of the drum 219 and thereby retard or even stop the movement of the turret. During this period the friction clutch 240 merely slips allowing continued rotation of the output shaft 222 from the reduction drive 21. Drum 219 is secured to the center main hollow supporting post 214 in any suitable manner.

Although the operation of the device has been explained during the detailed description of the parts of the apparatus, a short summary will be given for a clearer understanding of the apparatus.

The motor 20 is energized to continuously drive the turret through reduction drive 21 and friction clutch 22 except at such times as the braking means is actuated. The operator will be seated in a position shown in dotted lines in Fig. 10 and marked by the letter O. The operator is supplied with a series of articles such as plates or the like, which have print tissues initially applied thereto but not pressed thereon. The arms 170, 171, 155, and 156 serve to actuate the pneumatic rams and diaphragm valves so that as each set or pair of diaphragms approaches the operator the diaphragms will be deflated and then opened so as to allow the operator to remove an article therefrom and insert an article therein. The pairs of diaphragms after receiving an unpressed article, will be advanced in a clockwise direction as viewed in Fig. 10, the diaphragms closed and air under pressure supplied behind the diaphragms to cause the diaphragms to tightly press the print tissue against the article to cause a transfer of the print from the tissue to the article. As can be seen in Fig. 6, the article A is entirely supported by the diaphragms, and therefore, there will be no bending forces on the article because the air under pressure is the same behind both diaphragms and is supplied simultaneously behind those diaphragms, and since the air under pressure behind both of the diaphragms will equalize itself so as to apply the same force to the whole area of the article there will be no bending forces applied to the plate. In one apparatus constructed the air pressure behind the diaphragms was fifty pounds per square inch and yet the breakage was practically negligible and in cases where there was breakage it could not be determined whether it was caused by the pressure behind the diaphragms or whether the plate or article itself was faulty. However, by providing sponge rubber pads 250 and 251 on the faces of the diaphragms a more successful transfer of the print is usually possible. Although smearing of the print using the diaphragms alone is very little, there is even less smearing and breakage by using the sponge rubber pads 250 and 251. It is to be understood that the sponge rubber pads are not formed into the shape of the articles to be operated on but are merely flat disc-shaped sponge rubber pads. One advantage of the present invention is that the apparatus embodying the invention does not require the use of special molds or forms to fit the particular article to be treated, providing the article is relatively flat such as dishes, saucers, and the like, since the diaphragms readily conform to the shape of the article being treated and apply a uniform force to all areas of the article, thereby avoiding breakage as before brought out and yet making the machine extremely versatile in that it can handle a wide range of relatively flat articles without requiring a change in mold forms and the like. Where articles, such as cups, deep bowls, and the like are to have a print applied thereto, it is contemplated that the diaphragms will be formed to have an initially undistorted shape, such as to approximately conform to the inner and outer contour of the cup, deep bowl or the like. Even here, however, the present invention provides an apparatus having advantages not found in prior apparatus since, for a particular conformity of the diaphragms, a number of different shaped bowls or cups can have prints applied thereto even though the cups or bowls vary somewhat as to shape.

Various changes may be made in the details of construction without departing from the spirit and scope of the invention as defined by the appended claims.

I claim:

1. In a device of the class described, a rotary turret having a plurality of pairs of diaphragms with the diaphragms of each pair being supported for movement toward and away from one another, means for rotating the turret, means for successively causing opening and closing movements of the diaphragms whereby a print tissue-carrying article can be inserted between or withdrawn from between the diaphragms, and means for supplying air under pressure to behind the diaphragms only when the diaphragms are together.

2. In a device of the class described, a rotary turret having a plurality of pairs of diaphragms with the diaphragms of each pair being supported for movement toward and away from one another, means for rotating the turret, means for successively causing opening and closing movements of the diaphragms whereby a print tissue-carrying article can be inserted between or withdrawn from between the diaphragms, and means for supplying air under pressure to behind the diaphragms only when the diaphragms are in closed position.

3. In a device of the class described, a rotary turret having a plurality of pairs of diaphragms with the diaphragms of each pair being supported for movement toward and away from one another, means for rotating the turret, means for successively causing opening and closing movements of the diaphragms whereby a print tissue-carrying article can be inserted between or withdrawn from between the diaphragms, and means for simultaneously supplying air under pressure behind the diaphragms of each pair only when the diaphragms are in closed position.

4. In a device of the class described, a rotary turret having a plurality of pairs of diaphragms with the diaphragms of each pair being supported for movement toward and away from one another, means for rotating the turret including a friction clutch, means operable to brake the turret to retard rotation thereof, means for successively causing opening and closing movements of the diaphragms whereby a print tissue-carrying article can be inserted between and withdrawn from between the diaphragms, and means for supplying air under pressure behind the diaphragms only when the diaphragms are in closed position.

RALPH H. MARTIN.

References Cited in the file of this patent

UNITED STATES PATENTS

| Number | Name | Date |
| --- | --- | --- |
| 1,872,693 | Drake | Aug. 23, 1932 |
| 2,054,864 | Owen | Sept. 22, 1936 |
| 2,407,321 | Miller | Sept. 10, 1946 |
| 2,519,661 | Johnson | Aug. 22, 1950 |
| 2,565,949 | Clifford | Aug. 28, 1951 |

FOREIGN PATENTS

| Number | Country | Date |
| --- | --- | --- |
| 527,173 | Great Britain | Oct. 3, 1940 |